I. C. CRANE.
Steam-Plow.
No. { 1,977, / 32,981. }
Patented Aug. 6, 1861.
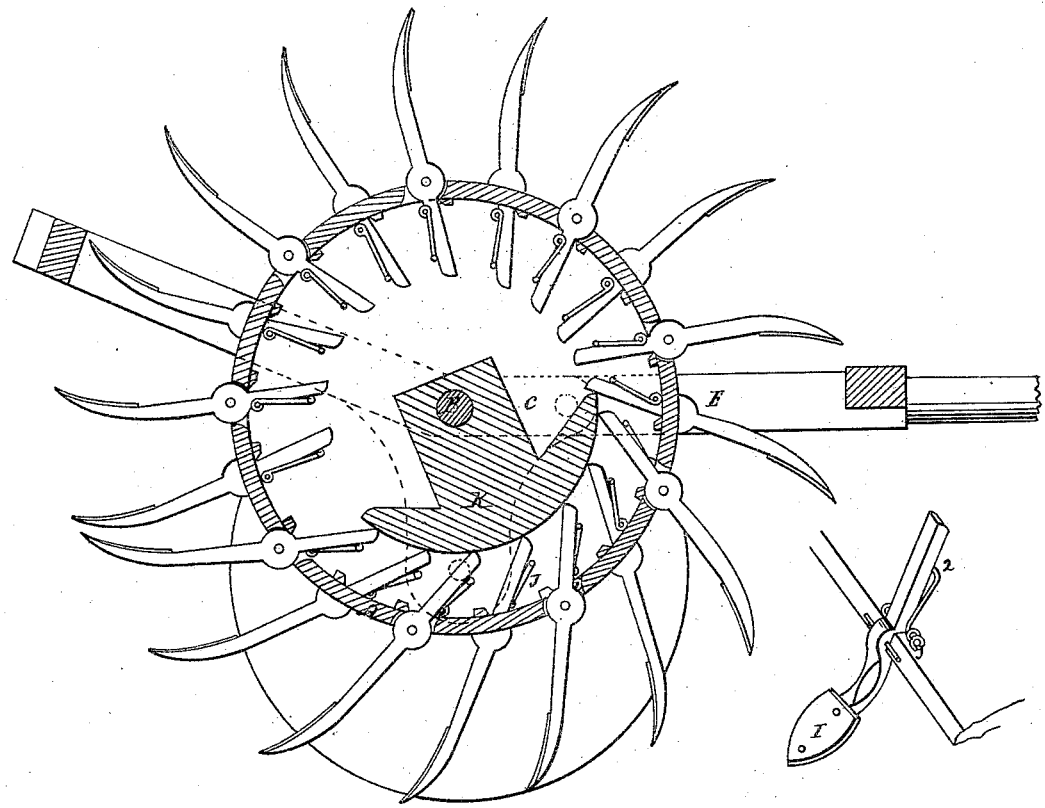
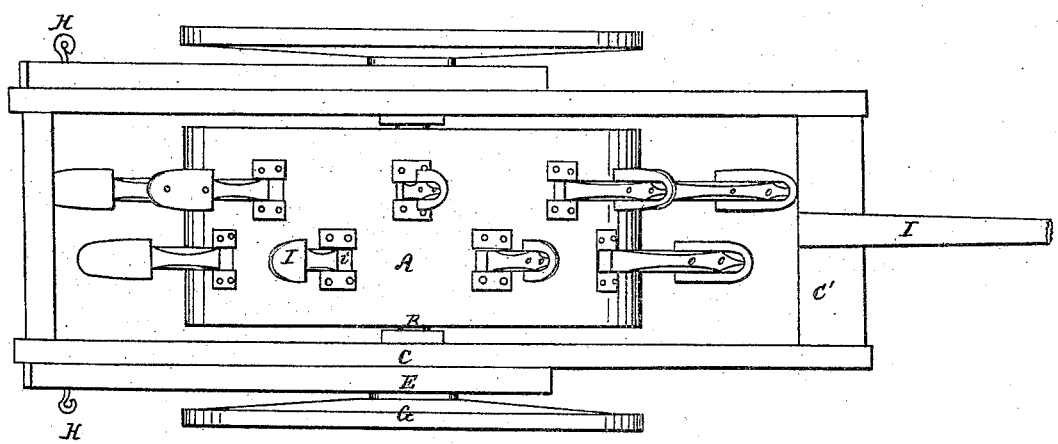
Witnesses:
Inventor:

UNITED STATES PATENT OFFICE.

ISAAC C. CRANE, OF BRONSON, MICHIGAN.

IMPROVEMENT IN SPADING-MACHINES.

Specification forming part of Letters Patent No. 32,981, dated August 6, 1861.

*To all whom it may concern:*

Be it known that I, ISAAC C. CRANE, of Bronson, in the county of Branch and State of Michigan, have invented a new and useful Improvement in Spading-Machines; and I do hereby declare that the following is a full, clear, and exact description of the same, reference being had to the accompanying drawings, making part of this specification, in which—

Figure 1 represents my invention by a plan. Fig. 2 is a vertical longitudinal section taken at $x\ x$, Fig. 1. Fig. 3 is a perspective view of a detached position of the revolving cylinder, showing the spade and spring in position.

Similar letters of reference indicate corresponding parts in the several figures.

The nature of my invention consists in a certain combination of parts for operating a series of spades arranged upon the periphery of a revolving cylinder by means of a cam and springs as the cylinder is revolved by being drawn over the ground, as hereinafter more fully explained.

To enable others skilled in the art to make and use my invention, I will proceed to describe its construction and operation.

A represents a revolving hollow cylinder, fitted loosely upon an axle, B, which is rigidly secured at each end in the side pieces, C C, of the carriage-framing.

E E represent arms pivoted to the side pieces, C C, in front of the axle of the revolving cylinder. In the downwardly-projecting portion F (shown in red and dotted lines in Fig. 2) of the said arms a stud-journal axle is secured, upon which the wheels G G are fitted to support the machine when not in operation and for transporting the machine from place to place.

H H are pins passing through the loose ends of the arms and the side pieces of the framing for the purpose of holding the machine in an elevated position or cause it to rest upon the wheels so that it can be transported. By withdrawing the said pin the cylinder and spades can be gradually lowered upon the ground, the weight of the machinery as the cylinder is revolved causing the spades to bury themselves in the ground while the cylinder rests upon the surface.

I I represent the spades or shovels, of which there may be two or more rows arranged circumferentially upon the cylinder, so that when there are but two rows they will alternately enter the ground. The shanks of the spades are pivoted in openings $i\ i$ in the cylinder.

J J are springs secured within the cylinder and employed to hold the spade-shanks in their extreme backward or normal position.

K represents a stationary cam which extends from end to end of the cylinder, and is secured to the axle B, upon which the cylinder revolves.

The machine may be propelled by steam or other suitable power, or by animals attached to the pole L connected to cross-piece C′.

The stationary cam is placed within the cylinder in such relation to the line of draft that as the machine is advanced the inner ends of the tripping-levers or shanks are successively brought in contact with the surface of the cam, and the spades thereby caused, as the cylinder is revolved, to descend into the ground in such position as to meet with the least possible resistance. After passing through the earth the spades retain the same relative position parallel with the ground when the inner ends escape from the cam and the spring gives a sudden jerk to the spade in returning it to its normal position, thus precipitating the soil raised by the spade to the ground in such a manner as to break and pulverize the clods.

By the above-described construction and arrangement of parts a machine is produced which is capable of doing a great amount of work in the best manner with comparatively a small expenditure of power.

Having thus described my invention, what I claim as new, and desire to secure by Letters Patent, is—

The combination of rotary cylinder A, segmental cam K, pivoted spades I, and springs J, all constructed, arranged, and operating in the manner and for the purposes explained.

ISAAC C. CRANE.

Witnesses:
A. C. R. GARRISON,
R. COMPTON.